United States Patent
Asim et al.

(10) Patent No.: US 9,401,811 B2
(45) Date of Patent: Jul. 26, 2016

(54) ATTRIBUTE-BASED DIGITAL SIGNATURES

(75) Inventors: Muhammad Asim, Eindhoven (NL); Milan Petkovic, Eindhoven (NL)

(73) Assignee: Koninkijke Philips N.V., Eindhoven (NL)

( * ) Notice: Subject to any disclaimer, the term of this patent is extended or adjusted under 35 U.S.C. 154(b) by 79 days.

(21) Appl. No.: 13/818,178

(22) PCT Filed: Aug. 22, 2011

(86) PCT No.: PCT/IB2011/053672
§ 371 (c)(1),
(2), (4) Date: Feb. 21, 2013

(87) PCT Pub. No.: WO2012/025866
PCT Pub. Date: Mar. 1, 2012

(65) Prior Publication Data
US 2013/0159730 A1 Jun. 20, 2013

(30) Foreign Application Priority Data
Aug. 24, 2010 (EP) .................................. 10173838

(51) Int. Cl.
*H04L 29/06* (2006.01)
*H04L 9/32* (2006.01)
*H04L 9/30* (2006.01)

(52) U.S. Cl.
CPC ............ *H04L 9/3247* (2013.01); *H04L 9/3073* (2013.01); *H04L 9/3255* (2013.01); *H04L 2209/76* (2013.01)

(58) Field of Classification Search
CPC ....... H04L 9/32; H04L 9/3247; H04L 9/3255; H04L 9/3257
USPC ......................................... 713/176–180, 189
See application file for complete search history.

(56) References Cited

U.S. PATENT DOCUMENTS

| | | | | | |
|---|---|---|---|---|---|
| 5,422,953 | A | * | 6/1995 | Fischer | G06F 21/725 380/30 |
| 5,659,616 | A | * | 8/1997 | Sudia | G06Q 20/341 380/30 |

(Continued)

FOREIGN PATENT DOCUMENTS

JP 2006325072 A 11/2006

OTHER PUBLICATIONS

Tulasi Menon, An Identity Based Proxy Re-Signature Scheme, IACSIT International Journal of Engineering and Technology, vol. 4, No. 3, Jun. 2012, p. 303-306).*

(Continued)

*Primary Examiner* — Hadi Armouche
*Assistant Examiner* — Sher A Khan

(57) ABSTRACT

An attribute-based digital signature system is disclosed. A first signature generating unit (1) is used for generating a first signature (10) for a document (11), based on a first signature key (12) and the document (11). A re-signing unit (2) is used for generating a second signature (13) for the document (11), based on the first signature (10) and a re-signing key (14), wherein the re-signing unit (2) is arranged for handling attributes (15, 16) associated with the first signature (10) and/or the second signature (13). The second signature (13) is associated with a second set of attributes (16,16') determined by the re-signing key (14), wherein the second set of attributes (16) comprises a plurality of attributes. The first signature (10) is associated with a first set of attributes (15), wherein the first set of attributes (15) comprises a plurality of attributes, and the re-signing unit (2) is arranged for generating the second signature (13) only if the first set of attributes (15) satisfies a set of conditions (17, 17').

17 Claims, 3 Drawing Sheets

(56) References Cited

U.S. PATENT DOCUMENTS

| | | | | |
|---|---|---|---|---|
| 6,151,676 | A * | 11/2000 | Cuccia | H04L 9/3013 380/259 |
| 8,171,527 | B2 * | 5/2012 | Qiu | H04L 9/3226 380/247 |
| 8,276,209 | B2 * | 9/2012 | Knibbeler | H04L 63/0492 380/258 |
| 8,316,237 | B1 * | 11/2012 | Felsher | H04L 9/0825 380/282 |
| 2002/0069174 | A1 * | 6/2002 | Fox | G06Q 20/3821 705/52 |
| 2002/0138735 | A1 * | 9/2002 | Felt | G06Q 20/3829 713/176 |
| 2003/0221104 | A1 * | 11/2003 | Baessler | H04L 63/062 713/175 |
| 2004/0181756 | A1 * | 9/2004 | Berringer | G06F 21/64 715/210 |
| 2008/0164976 | A1 * | 7/2008 | Griffiths-Harvey | H04L 9/3066 340/10.1 |
| 2009/0327735 | A1 * | 12/2009 | Feng et al. | 713/180 |
| 2010/0037062 | A1 * | 2/2010 | Carney | H04L 9/3247 713/176 |
| 2010/0106973 | A1 * | 4/2010 | Guenther | H04L 9/3281 713/176 |
| 2010/0161992 | A1 * | 6/2010 | Schuetze | G06F 12/1466 713/176 |
| 2011/0167010 | A1 * | 7/2011 | Soppera | G06Q 30/0185 705/318 |
| 2012/0204035 | A1 * | 8/2012 | Camenisch et al. | 713/186 |
| 2012/0300937 | A1 * | 11/2012 | Burbridge | H04L 9/083 380/278 |
| 2013/0212744 | A1 | 8/2013 | Monir et al. | |

OTHER PUBLICATIONS

Ateniese et al, "Proxy Re-Signatures:S New Definitions, Algorithms, and Applications", 12th ACM Conference on Computer and Communiations Security (CCS), 2005, pp. 310-319.

Shao et al, "Proxy Re-Signature Schemes Without Random Oracles", Indocrypt, vol. 4859 of LNCS, 2007, pp. 197-209.

Libert et al, "Multi-Use Unidirectional Proxy Re-Signatures", Universite Catholique De Louvain, Crypto Group, Feb. 8, 2008, pp. 1-16.

Maji et al, "Attribute-Based Signatures: Achieving Attribute-Privacy and Collusion-Resistance", XP-002666414, Department of Computer Science, Univerrseity of Illinois, Apr. 15, 2008, pp. 1-23.

Khader, "Attribute Based Group Signatures", International Association for Cryptologic Research (IACR), 2007, 241, pp. 1-18.

* cited by examiner

ATTRIBUTE-BASED DIGITAL SIGNATURES

FIELD OF THE INVENTION

The invention relates to attribute-based digital signatures.

BACKGROUND OF THE INVENTION

An increasing need for data exchange among different parties involved in a care cycle ranging from traditional healthcare via home healthcare to wellness services has made secure management of health data a major issue. Today's approaches, which are based on traditional security mechanisms complemented with the necessary physical and administrative procedures, limit the availability of health information and make the exchange of health records cumbersome. Digital policy management and enforcement technologies outperform these traditional approaches by offering the possibility to realize (1) end-to-end privacy and security in heterogeneous networks, protecting the data independently of the infrastructure over which data travels or institutional boundaries; (2) cryptographic enforcement of role-based or attribute-based access control mechanisms, which is very important in healthcare applications, allowing only users with appropriate attributes (e.g. roles) to decrypt or sign a message, based on a secret key associated with his/her attributes.

One of the important aspects of the workflow in healthcare is non-repudiation of origin, which means that the receiver of the data can verify the data origin. In daily life, digital signatures are used to implement the non-repudiation property. In traditional signature schemes, a private and public key pair is generated for each user, of which pair the secret key can be used to sign a message while the public key can be used to verify the signature on the message. However, in a healthcare organization, attributes are usually used to describe the role and identity of the user, and access to data is being granted based on the user attributes. So the user may create or modify and then sign that data if and only if he/she has the right set of attributes. For this purpose, attribute-based signatures are being used, as described for example in Dalia Khader, "Attribute Based Group Signatures", International Association for Cryptologic Research (IACR), 2007, 241. Hence, in healthcare, attributes are considered to be a major source of proving the data origin. These attributes may also comprise individual attributes that are unique to an individual in a specific domain (e.g. name or identifier). For example, a pharmacy will accept a prescription order if it has been signed by a specific user with a certain role (e.g. doctor John Smith). In another use case related to medical research where anonymity is important, a patient can sign his health record using only his non-unique attributes (such as that he is a 30-40 year old male). Hence, an important component of the attribute-based encryption (ABE) system for protection of health data is the attribute-based signature (ABS) scheme.

In attribute-based signature (ABS), the data is signed using a secret key $SK_\omega$ associated with the attribute set $\omega$ possessed by the user. To be able to sign a message, a user gets from the trusted authority a specific private key that corresponds to the set of certified attributes he/she has. As already mentioned, a user may also have the flexibility to select a subset of the secret key related to the subset of attributes which he/she may want to use for a particular signing operation.

SUMMARY OF THE INVENTION

It would be advantageous to have an improved attribute-based digital signature system. To better address this concern, in a first aspect, the invention provides a system comprising:

a first signature generating unit for generating a first signature for a document, based on a first signature key and the document; and a re-signing unit arranged for generating a second signature for the document based on the first signature and a re-signing key, wherein the re-signing unit is arranged for handling attributes associated with the first signature and/or second signature.

This system allows configuring re-signing capabilities, based on attributes associated with signatures. Because of the re-signing unit, the authority to sign may be delegated without giving the delegatee the signature key of the delegator. Instead, the delegatee is enabled to convert his or her signature into the delegator's signature using the re-signing unit, which may be a semi-trusted unit or proxy. By configuring the re-signing unit to handle attributes associated with the signatures, the re-signing functionality becomes more flexible. Delegation tasks need not be performed on a user-by-user basis, because attributes of keys can be used to specify, for example, what attributes associated with the first signature are needed to use the re-signing unit and/or what attributes are associated with the second signature. Consequently, delegators can delegate tasks to groups of users, based on their attributes. The re-signing unit may be arranged for converting the first signature into the second signature, wherein the second signature replaces the first signature for the document, and the second signature can be verified independently of the first signature.

The second signature may be associated with a second set of attributes determined by the re-signing key, wherein the second set of attributes comprises a plurality of attributes. The re-signing unit allows converting the first signature into a signature associated with the second set of attributes. This makes it possible to implement several usage scenarios that cannot be implemented with the existing attribute-based digital signature systems. For example, the system makes it possible to delegate authority to sign documents with a particular set of attributes to a user without giving the user a signature key associated with that set of attributes. Instead, the user is only given the first signature key, and has to invoke the re-signing unit to convert the signature generated with the first signature key into the desired second signature associated with the second set of attributes. The re-signing unit may be implemented as a semi-trusted proxy.

Alternatively or additionally, the first signature may be associated with a first set of attributes, wherein the first set of attributes comprises a plurality of attributes, and the re-signing unit may be arranged for generating the second signature only if the first set of attributes satisfies a set of conditions. This allows a delegator to authorize a group of users without specifying specific user IDs of the delegatees. Instead, the authorization can be performed on the basis of attributes (e.g., roles) of users which are represented in their first signature keys.

The system may comprise a re-signing key generator for generating the re-signing key based on a second signature key associated with the second set of attributes, wherein the re-signing key enables the re-signing unit to convert the first signature into the signature associated with the second set of attributes, and wherein the second signature key enables a second signature generating unit to generate a signature associated with the second set of attributes based on the document itself. Typically, control of the second signing key is entrusted to a person who has the authority to sign documents with the second set of attributes. Using the re-signing key generator as described, that person can create the re-signing key by providing the second signing key to the re-signing key generator.

Any master key of the attribute-based signature system may not be needed. This makes it relatively easy to delegate authority to sign.

The re-signing key generator may be arranged for further generating the first signature key based on the second signature key, wherein the first signature key and the re-signing key are generated as a key pair, and the first signature key is provided to the first signature generating unit and the re-signing key is provided to the re-signing unit. This scheme makes it possible to enable a user who does not have any key, to sign documents with the second set of attributes. A dedicated first signature key may be given to the user to prepare the first signature, which first signature may then be converted into the signature associated with the second set of attributes by the re-signature unit and re-signature key. This way, the re-signing key generator does not need to know about any existing keys in the possession of the delegatee user, because the delegatee gets a new first signature key from the re-signing key generator, which first signature key can be used in conjunction with the re-signing unit and re-signing key for signing messages on behalf of the delegator.

The system may comprise a re-signing key generator arranged for generating the re-signing key in dependence on the set of conditions, wherein the re-signing key enables the re-signing unit to convert a signature associated with any set of attributes satisfying the set of conditions into the second signature. This makes the system more flexible, because it is not necessary to produce a re-signing key for each user, instead existing users having first signature keys associated with respective sets of attributes satisfying the set of conditions can convert their signature into a signature associated with the second set of attributes. The set of conditions may be referred to as a policy.

The re-signing unit may be arranged for using a public key to verify whether the first signature is associated with a set of attributes satisfying a set of conditions, and for generating the second signature only in the case that the first signature is associated with a set of attributes satisfying the set of conditions. This improves the security of the system and/or prevents erroneous signatures from being generated, because only the intended signatures may be converted.

The system may comprise a delegation unit for enabling a user who possesses the second set of attributes to delegate his authority to sign a document with a signature associated with the second set of attributes to another user by providing the re-signing unit with the re-signing key. This facilitates delegation of authority to sign. The delegation process controlled by the user may further comprise allowing a delegatee to cause the re-signing unit to convert a first signature into a corresponding second signature, using the re-signing key. The delegation unit may further enable the user to revoke or remove the re-signing key from the re-signing unit. This makes it easy to withdraw the authority to sign.

In another aspect, the invention provides a workstation comprising the system set forth.

In yet another aspect, the invention provides a method of attribute-based digital signature generation, comprising:

generating a first signature for a document, based on a first signature key and the document; and generating a second signature for the document, based on the first signature and a re-signing key, including handling attributes associated with the first signature and/or second signature.

In another aspect, the invention provides a computer program product comprising instructions for causing a processor system to perform the method set forth.

US 2009/0327735 A1 discloses a proxy re-signature system for transforming a delegatee's signature on a message m into a delegator's signature on the same message m. This document does not disclose an attribute-based signature system.

BRIEF DESCRIPTION OF THE DRAWINGS

These and other aspects of the invention are apparent from and will be elucidated with reference to the embodiments described hereinafter. In the drawings.

DETAILED DESCRIPTION OF EMBODIMENTS

Figure 1:
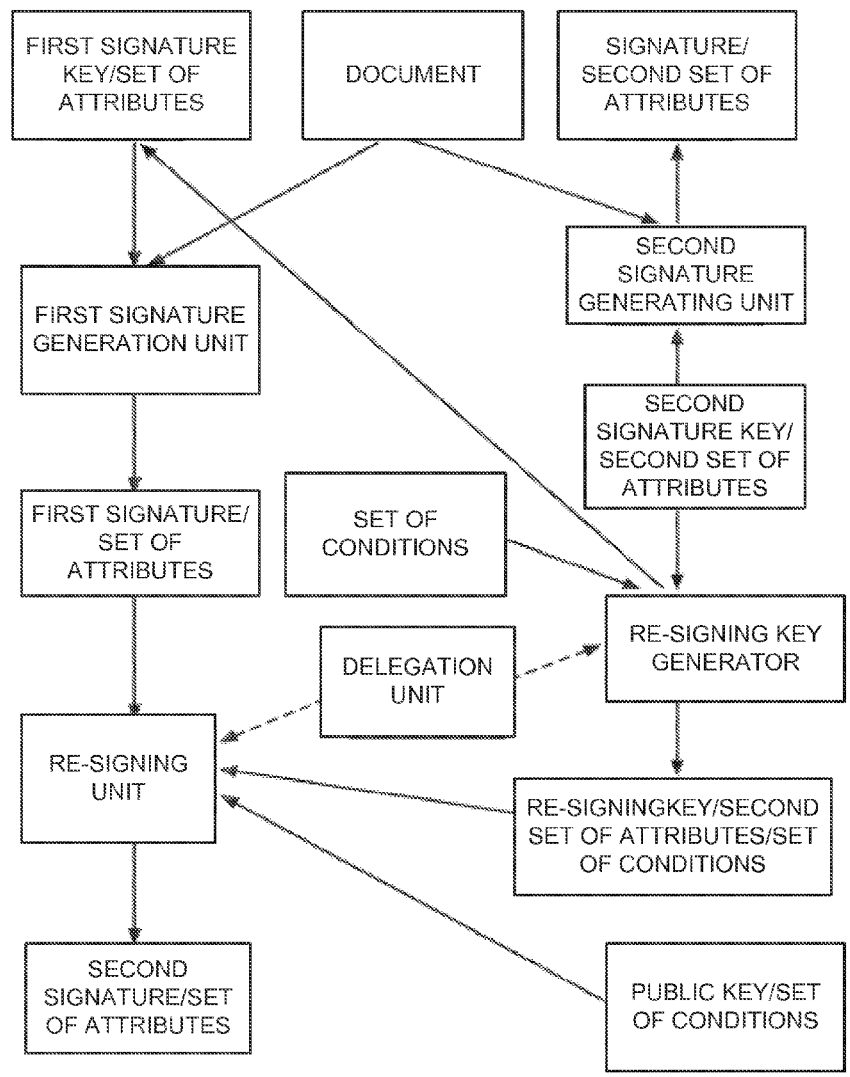
FIG. 1 is a diagram of an attribute-based digital re-signature system.

In this description, an Attribute-based Proxy Re-Signature Scheme (ABPRSS) is disclosed. Several variants of the scheme will be described as examples. However, the skilled person is able to implement variations of these examples and combine features described in the different examples. Attribute based signature can be considered as a form of group signature. It allows a verifier to determine attributes (e.g. a role) of the signer. However, in practice there are scenarios where a signature from one entity is transformed into that of the other entity. One of the examples is a delegation scenario, however this is not a limitation. These scenarios may be addressed by the different variants of the scheme proposed herein. The scheme deploys a semi-trusted proxy, or more generally a re-signing unit, which transforms the signature from the entity A (delegatee) into that of the entity B (delegator), using the re-signature key given by the delegator.

Although the attribute based signature are useful in a number of scenarios in daily life, the healthcare practice puts forward a number of additional, desirable features not available in an existing attribute-based signature scheme. In healthcare a user may very often want to delegate signing capability to one of his colleagues (or subordinates). For example a doctor may want a nurse to sign a prescription on behalf of him. The nave approach would be that the doctor gives his secret key to the nurse who will then sign on his behalf using traditional ABS schemes. As will be evident, the main drawback is that the nurse learns his secret key and can continue using it without his permission. The proxy re-signature scheme provides an alternative which provides delegation capabilities in a manner which to some extent may be secure and efficient. The word "secure" as used here means that the delegatee cannot learn the secret key of the delegator and the word "efficient" means broadly that the burden on the delegatee in terms of key storage etc is also minimal.

Hence ABPRSS is proposed, wherein the signature for the doctor is produced by a delegatee and a semi-trusted proxy. For example, the doctor (delegator) generates a re-signature key from his secret key $SK_{\omega_{delegator}}$ (example of second signature key) associated with the attribute set $\omega_{delegator}$. The re-signature key is then used by the semi-trusted proxy to transform the signature of the nurse (generated using her own secret key $SK_{\omega_{delegatee}}$ (example of first signature key)) into that of the doctor (delegator), only if the nurse wants the semi-trusted proxy to transform her signature into that of the doctor (delegator). One of the desirable properties for such a system is that no one by himself (nurse or proxy) should be able to produce the signature on behalf of the doctor. In addition, even collusion between the nurse and the semi-trusted proxy should not enable them to recover the secret key-$SK_{\omega delegator}$ of the doctor (delegator).

The applicability of such a scheme is of course not limited to delegation scenarios only. In another example, ABPRSS could be used to transform an employee signature, which can be verified under the public key of the employee, into a department or company signature, which can be verified under the public key of the department or company. This helps prevent information leakage on the company's corporate structure or employee profile, while still allowing internal auditing.

Another application of ABPRSS is in scenarios where the document is signed by multiple entities in the workflow chain and each entity has a different set of attributes. Hence, by using the proposed scheme, only one signature needs to be stored with the document which upon verification will confirm that it has been signed by the correct entities using valid signature keys.

Referring to FIG. 1, an embodiment of the ABPRSS will be described. FIG. 1 shows a diagram illustrating aspects of an attribute-based digital signature system. For example, the system may be implemented on a distributed computer system having suitable software loaded thereon.

The system may comprise a setup unit (not shown) for generating a public key and a master key. Moreover, the system may comprise a key generation unit (not shown), for generating the first signature key 12 and/or the second signature key 18, as appropriate, based on the master key. This portion of the system is not shown for clarity reasons.

The system may comprise a first signature generating unit 1 for generating a first signature 10 for a document 11, based on a first signature key 12 and the document 11. This first signature key 12 may be associated with a set of attributes 15', in accordance with an attribute-based signature scheme, enabling the first signature generating unit 1 to generate a signature 10 associated with that set of attributes 15. However, this is not a limitation. It is also possible that the first signature key 12 and the first signature 10 do not have attributes 15',15 associated therewith. After conversion by the re-signing unit, the second signature 13 may be associated with a set of attributes 16,16''' determined by the re-signing key 14. Conversely, it may be the case that the first signature key 12 and the first signature 10 are associated with a set of attributes 15',15, which may be checked by the re-signing unit 2 against a policy comprising a set of conditions 17,17' to control which users can convert their first signature into the second signature, while the second signature 13 and the re-signing key 14 do not have attributes 16,16''' associated therewith. It is also possible, as shown in FIG. 1, that the first signature key 12 and the first signature 10 are associated with a first set of attributes 15',15, which may be checked against the set of conditions 17,17', and that the re-signing key 14 and the second signature 13 are associated with a different second set of attributes 16',16.

The system may further comprise a re-signing unit 2 arranged for generating a second signature 13 for the document 11, based on the first signature 10 and a re-signing key 14. The re-signing unit may handle the attributes 15 associated with the first signature 10 and/or the attributes 16''' associated with the re-signing key 14. Also the re-signing unit may handle any attributes 16 of the second signature 13, for example by causing this second signature 13 to be associated with a set of attributes 16. Typically this set of attributes 16 corresponds to the set of attributes 16''' associated with the re-signing key 14. Consequently, the set of attributes 16 associated with the second signature 13 may be different from the attributes 15 (if any) associated with the first signature 10.

As mentioned before, the first signature 10 may be associated with a first set of attributes 15, wherein the first set of attributes 15 comprises a plurality of attributes. The re-signing unit 2 may be arranged for evaluating the set of attributes 15 associated with the first signature 10 to verify whether the first signature 10 is allowed to be converted into the second signature 13. This verification may be done explicitly, using the verification algorithm of the attribute-based signature scheme in combination with a public key 20 to verify compliance of the set of attributes 15 against a policy comprising a set of conditions 17' over the attributes. Alternatively, the verification may be done implicitly. In the latter case, the set of conditions 17 is incorporated cryptographically into the re-signing key 14, in such a way that the algorithm which uses the re-signing key 14 to convert the first signature 10 into the second signature 13, will fail to produce a valid second signature 13 unless the first set of attributes 15 matches the set of conditions 17. More generally, the re-signing unit 2 may be arranged for generating the second signature 13 only if the first set of attributes 15 satisfies a set of conditions 17 or 17'.

The system may comprise a second signature generating unit 4 to generate a signature 19 associated with the second set of attributes 16'', based on the document 11 and the second signature key 18. This second set of attributes 16'' corresponds to the second set of attributes 16 associated with the second signature 13 and with the second set of attributes 16''' associated with the re-signing key 14.

In a typical scenario, the second signature generating unit 4 and the second signature key 18 are used by the user possessing the second set of attributes 16'. The first signature generation unit 1 and the re-signing unit 2 are used by a user who is authorized by the user possessing the attributes to sign on his or her behalf. A re-signing key generator 3 may be controlled by the user possessing the attributes to generate the re-signing key 14 to authorize a particular user or group of users to sign on his or her behalf.

The system may comprise a re-signing key generator 3 for generating the re-signing key 14, based on a second signature key 18 associated with the second set of attributes 16'. In this case, the re-signing key 14 enables the re-signing unit 2 to convert the first signature 10 into a second signature 13 associated with the second set of attributes 16.

The re-signing key generator 3 may also be arranged for generating a re-signing key 14 which is capable of converting a first signature 10 associated with a set of attributes 15 satisfying a set of conditions 17 defined by the re-signing key 14. Such a re-signing key is thus associated with a set of conditions 17, or policy, over the attributes. In the process of conversion by the re-signing unit 2, the attributes 15, which are digitally represented by the first signature 10, are cryptographically combined with the set of conditions 17, which are digitally represented by the re-signing key 14, to form the second signature 13. When the re-signing key 14 is associated with a second set of attributes 16', the re-signing process effectively may replace the attributes 15 associated with the first signature 10 by the attributes 16,16' associated with the re-signing key 14.

The re-signing key generator 3 may be arranged for further generating the first signature key 12, based on the second signature key 18. Said first signature key 12 and re-signing key 14 may be generated as a key pair designed to be used together in the way described above; for example, the first signature generation unit 1 generates the first signature 10, based on the first signature key 12, and the re-signing unit 2 converts the first signature 10 into the second signature 13, using the re-signing key 14. To this end, the first signature key 12 may be provided to the first signature generating unit 1 and the re-signing key 14 may be provided to the re-signing unit 2.

The re-signing key generator 3 may be arranged for generating the re-signing key 14 in dependence on the set of conditions 17". This set of conditions 17" may be indicated by a user by means of a user input device which may be part of a delegation unit 5 to be described hereinafter. The re-signing key 14 may enable the re-signing unit 2 to convert a first signature 10 associated with any set of attributes 15 satisfying the set of conditions 17" into the second signature 13.

Alternatively or additionally, the re-signing unit 2 may be arranged for using a public key 20 to verify whether the first signature 10 is associated with a first set of attributes 15 satisfying a set of conditions 17'. Accordingly, the re-signing unit 2 may be arranged for generating the second signature 13 only in the case that the first signature 10 is associated with a set of attributes 15 satisfying the set of conditions 17'. To enforce this behavior, the re-signing unit 2 may be made tamper-resistant, using digital security techniques known in the art.

When both the first signature 10 and the second signature 13 are associated with a set of attributes, the system described herein may be used to replace the first signature 10 associated with a first set of attributes 15 by the second signature 13 associated with the second set of attributes.

The system may comprise a delegation unit 5 for enabling a user who possesses the second set of attributes 16' to delegate his authority to sign a document 11 with a signature associated with the second set of attributes 16 to another user by providing the re-signing unit 2 with the re-signing key 14. The delegation unit 5 may further be arranged for enabling the user to determine the set of conditions 17, 17', 17" used by the re-signing key generator 3 and/or re-signing unit 2. The delegation unit may comprise a user interface offering appropriate delegation options to the user.

The verification of a second signature 13 (optionally associated with a second set of attributes 16) may be carried out using a verification unit (not shown). This verification unit may verify the authenticity of the second signature. This verification verifies whether the second signature 13 is a valid signature of the document 11. When the second signature is associated with a second set of attributes 16, the verification unit further may verify the second signature's second set of attributes 16 against a set of conditions over the attributes. These verifications may be performed using a signature verification algorithm, examples of which are described hereinafter.

The system may be implemented in a workstation. Alternatively, the system may be implemented in a distributed system. For example, the first signature generation unit 1, the re-signing unit 2, and the re-signing key generator 3 may be hosted on separate computer devices. The re-signing key generator 3 may be hosted on the same computer device as the second signature generation unit 4. Rather than using different physical machines, it is also possible to give each user access to the appropriate units and keys, based on a user login system.

Figure 2:
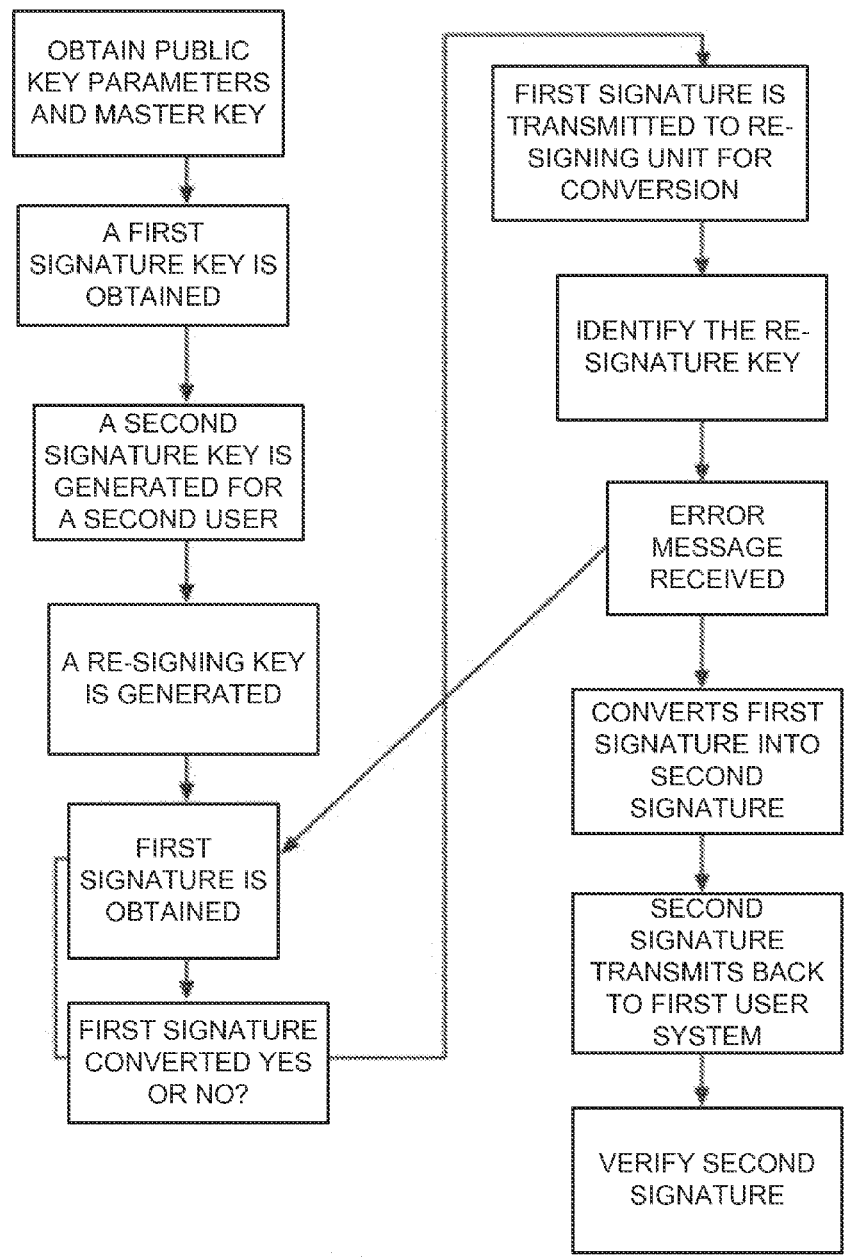
FIG. 2 is a flowchart of an attribute-based digital re-signature method.

FIG. 2 illustrates an example method of attribute-based digital signature generation. The system described above may be implemented in such a way that it is arranged for performing the following method or a modification thereof. In step 200, a setup algorithm is run to obtain public key parameters and a master key. In step 201, a first signature key is generated for a first user, using a key generation algorithm. In step 202, a second signature key is generated for a second user, using the same or a different key generation algorithm. In step 203, a re-signing key is generated using a re-key-generation algorithm, based on the second signature key. This re-signing key is stored on a re-signing unit, for example a semi-trusted server. In step 204, a message or document is signed by the first user using the first signature key, and a first signature is obtained. In step 205, it is determined whether the first signature should be converted. If not, the process returns to step 204. Otherwise, in step 206, the first signature is transmitted to the re-signing unit for conversion. In step 207, the re-signing unit receives the first signature and identifies the re-signature key in its storage means, e.g. by means of a database look-up. The re-signing unit further may verify whether the first signature and the re-signing key match, i.e., whether the first signature is allowed to be converted into the second signature using the re-signing key and also verifies the first signature to make sure that is a well-formed (or constructed) signature. In 208, if the first signature is not allowed to be converted, or it is not a well formed (or constructed) signature, the process may produce an error message and return to step 204, otherwise it continues at step 209. In step 209, the re-signing unit converts the first signature into the second signature, using a re-sign algorithm. In step 210, the second signature is transmitted back to the first user's system, and the first user may store the second signature in a public storage area or transmit it to a specific destination user, for example. In step 211, another user or the destination user receives the second signature and runs a verification algorithm to verify the second signature. This verification may be performed against a set of conditions on attributes the second signature is expected to represent.

The method may be implemented completely or partly in software, as a computer program product comprising instructions for causing a processor system to perform the method.

Attribute-based proxy re-signature scheme (ABPRSS) allows the proxy to transform the signature $\sigma_{delegatee}$ from the entity B (delegatee) signed using the secret key $SK_{\omega delegatee}$ to the signature $\sigma_{delegator}$ of the entity A (delegator) using the re-signature key.

In this description, the "proxy" refers to a unit capable of performing the computations for re-signature generation. This unit or proxy may be provided with digital security features to protect the unit from malicious use such as abuse of the re-signing key. Although the example schemes will be described with reference to delegator and delegatee keys and signatures, it will be understood that the transformations and algorithms described herein may also be used in different scenarios involving the conversion of one signature into another signature and involving an attribute-based signature scheme.

The Attribute Based Signature Scheme (ABSS) may comprise the following algorithms: 1) Setup; 2) Key Generation; 3) Sign and 4) Verify. Attribute-based proxy re-signature scheme (ABPRSS) extends the capability by adding two algorithms:

1) Re-KeyGeneration and 2) Re-Sign. A brief description of each of these algorithms is given below:

Setup: The setup algorithm configures system parameters during an initialization phase and outputs the public parameters PK and a master key MK.

Key Generation (MK, ω): The key generation algorithm takes as input the attribute set ω the user possesses and the master secret key MK, and it outputs user secret key $SK_\omega$.

Re-KeyGeneration($SK_\omega$): The Re-KeyGeneration algorithm, as an example, takes as input a user's secret key $SK_\omega$ associated with the attribute set ω and outputs the re-signature key that can be used to transform the signature from the entity "A" to that of the entity "B".

Sign (SK$_{\omega_{delegatee}}$, RSK$_{delegatee}$, m): This algorithm is run by the delegatee to produce the first level of signature. It takes as input the SK$_{\omega_{delegatee}}$ associated with attribute set ω$_{delegatee}$, optionally the re-signature key RSK and the message m.

Re-Sign (RSK$_{proxy}$, σ$_{delegatee}$): This may be run by the semi-trusted proxy. It takes as input the re-signature key associated with the attribute set ω$_{delegator}$ and the signature of the delegatee, i.e. σ$_{delegatee}$. It outputs the signature for the delegator i.e. σ$_{delegator}$.

Verify (σ$_{delegator}$, PK): This algorithm is run by the verifier. The algorithm takes as input a message m, the public key PK and signature σ$_{delegator}$. The algorithm returns 1 if the signature σ$_{delegator}$ is a valid signature or an error symbol ⊥ otherwise.

In the following, two embodiments are described, referred to as "first scheme" and "second scheme". These embodiments use two different examples of ABPRSS schemes. In the first scheme, the re-signature key associated with attribute set "ω (possessed by the delegator)" is divided into two components, one for the delegatee and another for the semi-trusted proxy, such that neither of them alone can generate the signature for the delegator. In the second scheme, a re-signature key is given only to the semi-trusted proxy while the delegatee signs using his or her own secret key associated with attribute set "ω (possessed by the delegatee)". In the second scheme, there needs to be no interaction between the delegatee and the delegator and the delegatee does not need to store extra re-signature keys to sign on behalf of the delegator. If the delegatee (entity "B") wants his or her signature transformed into that of the delegator (entity "A"), then entity "B" may produce a first level signature, so that it can be transformed by the semi-trusted proxy.

It will be understood that the first scheme and second scheme only represent examples of possible implementations of systems and methods of the kind described herein. Modifications of these schemes are possible. The algorithms described in the following may be used by the person skilled in the art, for example, to implement different units of the system described with reference to FIG. 1, or to further define the method steps described with reference to FIG. 2.

In the first scheme, a first part of the re-signature key RSK is given to the entity A (delegatee) and a second part of the re-signature key RSK is given to the proxy. The valid signature can be produced by the semi-trusted proxy only if the entity A (delegatee) first signs the message. In this case the delegatee has to store an extra secret key, i.e. part of the re-signature key-RSK.

In the second scheme, the delegatee produces the first level signature σ$_{delegatee}$ using secret key SK$_{\omega_{delegatee}}$ associated with the attribute set ω$_{delegatee}$ possessed by the delegatee. There is no need for interaction between the delegatee and delegator. If the delegatee wants his signature transformed into that of the entity A (delegator), then the delegatee signature comprises a few extra components. These extra components enable the proxy to transform the signature σ$_{delegatee}$ into that of the entity A (delegator)-σ$_{delegatee}$.

Figure 3:
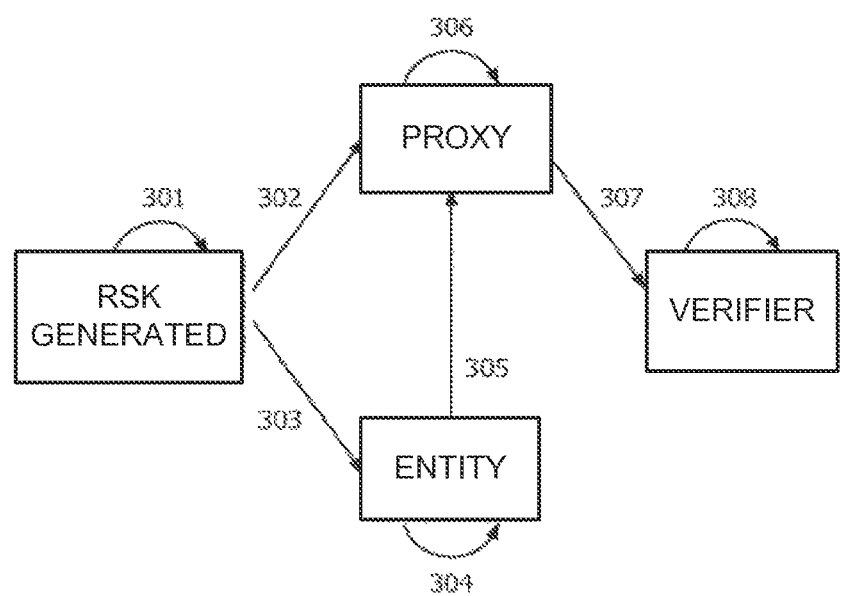
FIG. 3 is a functional diagram of an attribute-based proxy re-signature scheme.

FIG. 3 provides a functional diagram of an attribute-based proxy re-signature scheme. In step 301, the entity "A" generates the re-signature key RSK, using the Re-KeyGeneration Algorithm. RSK may comprise two components: one for the proxy and another for the entity "B". This is the case in the first designed scheme. In the second scheme introduced above, it comprises one component for the proxy. In steps 302 and 303, the re-signature keys, i.e. RSK$_{proxy}$ and RSK$_{delegatee}$, are sent to the proxy "P" and entity "B" respectively. In step 304, the entity "B" generates his or her signature using RSK$_{delegatee}$ (in the first scheme) or SK$_{delegatee}$ (in the second scheme). In step 305, entity "B" sends the output of step 4 to the proxy "P". In step 306, the semi-trusted proxy transforms the received signature from the entity "B" into that of the signature of the entity "A". In step 307, the proxy "P" sends the signature produced on behalf of the entity "A" to the verifier "V" (or receiver of the signed message). In step 308, the verifier "V" confirms whether the signature is from the entity "A" and is being signed by the secret key related to the correct set of attributes.

In the first scheme, user attributes are elements of $Z_p$, and it is assumed that there are at most k attributes. In practice, one can use a collision-resistant hash function to map an attribute string to an element of $Z_p$. The scheme comprises four algorithms:

Setup. The setup algorithm selects a bilinear group $G_0$ of prime order p and random generators g and h. It also chooses bilinear map e: $G_0 \times G_0 \to G_1$, where $G_1$ is the target group. In addition, the setup picks at random t, y, $x_1, x_2, \ldots, x_k \in Z_p$, and for a set of attributes $\Omega = \{a_1, a_2, \ldots, a_k\}$, it sets $T_j = g^{x_j}$ and $T'_j = h^{x_j}$ for ($1 \le j \le k$). The public key PK and the master key MK comprise the following components:

$$PK = (g, h, \{T_j\}_{j=1}^k, \{T'_j\}_{j=1}^k)$$

$$MK = (\{x_j\}_{j=1}^k)$$

KeyGeneration(MK,ω). The key generation algorithm outputs a user secret key associated with the attribute set ω. The algorithm picks a random element $x \in Z^*_p$ (where x is unique for each user). The secret key SK$_\omega$ comprises the following components:

$$SK_\omega = \left( \left\{ S_j^{(1)} = g^{\frac{x}{x_j}} \right\}_{a_j \in \omega}, S^{(2)} = g^x \right).$$

Re-KeyGeneration(SK$_\omega$). This algorithm is run by the delegator. The re-key generation algorithm outputs re-signature keys that can be used by the proxy and delegatee to sign on behalf of the delegator. The algorithm picks random elements $d \in Z_p$ and splits them into two parts $d_1, d_2$ such that $d = d_1 + d_2$. The re-signature key RSK$_\omega$ comprises the following two components, one for the delegatee and another for the proxy:

$$RSK_{delegatee} = \left( \left\{ g^{\frac{x}{x_j} d_1} \right\}_{a_j \in \omega}, g^{xd_1}, g^d, h^d \right)$$

$$RSK_{proxy} = \left( \left\{ g^{\frac{x}{x_j} d_2} \right\}_{a_j \in \omega}, g^{xd} \right).$$

Sign(RSK$_{delegatee}$,m). This algorithm is run by the delegatee to sign a message $m \in G_0$. The algorithm chooses a random element $s' \in Z^*_p$ and computes the signature σ$_{delegatee}$, which comprises the following components:

$$\sigma_{delegatee} = \left( \left\{ \sigma_{j_{dee}}^{(1)} = g^{\frac{x}{x_j}d_1} \cdot h^{ds'm} \right\}_{a_j \in \omega} \right)$$

$$\sigma_{dee}^{(2)} = g^{xd_1/s'}$$

$$\sigma_{dee}^{(3)} = g^{ds'}$$

$$\sigma_{dee}^{(4)} = g^{s'} \bigg).$$

Re-Sign(RSK$_{proxy}$, $\sigma_{delegatee}$, m). This algorithm is run by the proxy. Before producing the second level (or final signature), the proxy verifies the signature produced by the delegatee in the following manner:

$$I^{(1)} = e(\sigma_{j_{dee}}^{(1)}, \{T_j\}_{j=1}^k) = e(g,g)^{xd_1} \cdot e(g,h)^{ds'mxj} : \forall a_j \in w$$

$$I^{(2)} = e(\sigma_{dee}^{(2)}, \sigma_{dee}^{(4)}) \cdot e((\sigma_{dee}^{(3)})^m, \{T_j'\}_{j=1}^k) = e(g,g)^{xd_1} \cdot e(g,h)^{ds'mxj} : \forall a_j \in w$$

Now, if $I^{(1)} = I^{(2)}$ then the proxy may proceed to convert the signature produced by the delegatee to produce the second level (or final) signature. The algorithm chooses a random element $r \in Z^*_p$ and produces the second level signature:

$$\sigma_{proxy} = \left( \left\{ \sigma_{j_p}^{(1)} = g^{\frac{x}{x_j}d_2r} \cdot g^{\frac{x}{x_j}d_1r} \cdot h^{ds'mr} \right\}_{a_j \in \omega'} = \left\{ g^{\frac{x}{x_j}dr} \cdot h^{ds'mr} \right\}_{a_j \in \omega} \right)$$

$$\sigma_p^{(2)} = (\sigma_{dee}^{(3)})^r = g^{ds'r}$$

$$\sigma_p^{(3)} = g^{xdr} \bigg).$$

Verify($\sigma_{proxy}$, PK). If the following equation holds, then the signature is accepted:

$$e(\sigma_{j_p}^{(1)}, \{T_j\}_{j=1}^k) = e(\sigma_p^{(3)}, g) \cdot e(\{T_j'\}_{j=1}^k, (\sigma_p^{(2)})^m)$$

$$e\left( \left\{ g^{\frac{x}{x_j}dr} \cdot h^{ds'mr} \right\}_{a_j \in \omega}, \{T_j\}_{j=1}^k \right) = e(g^{xdr}, g) \cdot e\left( (g^{ds'r})^m, \{T_j'\}_{j=1}^k \right)$$

$$e(g,g)^{xdr} \cdot e(g,h)^{drs'mxj} = e(g,g)^{xdr} \cdot e(g,h)^{drs'mxj} : \forall a_j \in \omega$$

In the following, a description of the second embodiment of an attribute-based proxy re-signature system is given. The system comprises an implementation of the following algorithms.

Setup. The setup algorithm selects a bilinear group $G_0$ of prime order p and random generators g and h. It also chooses bilinear map e: $G_0 \times G_0 \to G_1$. In addition to this, the setup picks at random $x_1, x_2, \ldots, x_k \in Z_p$, and for a set of attributes $\omega = \{a_1, a_2, \ldots a_k\}$, it sets $T_j = g^{x_j}$ and $T'_j = h^{x_j}$ ($1 \le j \le k$). The public key PK and the master key MK comprise the following components:

$$PK = (g, h, \{T_j\}_{j=1}^k, \{T_j'\}_{j=1}^k)$$

$$MK = (\{x_j\}_{j=1}^k)$$

KeyGeneration(MK,$\omega$). The key generation algorithm outputs a user secret key associated with the attribute set $\omega$. The algorithm picks a random element x, t, $q \in Z^*_p$ such that x=tq (where x, t and q are unique for each user). The secret key $SK_\omega$ comprises the following components:

$$SK_\omega = \left( \left\{ S_j^{(1)} = g^{\frac{x}{x_j}} \right\}_{a_j \in \omega} \right.$$

$$\left. S^{(2)} = g^x, \left\{ S^{(3)} = g^{\frac{t}{x_j}} \right\}_{a_j \in \omega}, S^{(4)} = g^q \right).$$

Re-KeyGeneration($S_{\omega_{delegator}}$). The re-key generation algorithm outputs re-signature keys that can be used by the proxy to transform signatures from the delegatee into signatures of the delegator. The algorithm picks random elements d$\in$Z. The re-signature key RSK$_\omega$ comprises the following two components:

$$RSK_{(proxy)} = \left( RSK^{(1)} = (S_j^{(1)})^d = \left\{ g^{\frac{x}{x_j}d} \right\}_{a_j \in \omega} \right.,$$

$$RSK^{(2)} = (S^{(2)})^d = g^{xd} \bigg).$$

Sign(SK$_{\omega_{delegatee}}$, m). This algorithm is run by the delegatee to sign a message m$\in G_0$. The algorithm chooses a random element $s' \in Z^*_p$ and computes the signature $\sigma_{delegatee}$ using his/her own secret key. The signature $\sigma_{delegatee}$, which may also be referred to as $\sigma_{dee}$, comprises the following components:

$$\sigma_{dee} = \left( \left\{ \sigma_{j_{dee}}^{(1)} = g^{\frac{x}{x_j}s'} \cdot h^{s'm} \right\}_{a_j \in \omega_{dee}} \right.$$

$$\sigma_{dee}^{(2)} = g^{s'}, \sigma_{dee}^{(3)} = g^{xs'}$$

$$\left. \sigma_{dee}^{(4)} = g^{\frac{-s't}{x_j}}_{a_j \in \omega_{dee}}, \sigma_{dee}^{(5)} = g^{qs'} \right).$$

Re-Sign(RSK, $\sigma_{delegatee}$, m). This algorithm is run by the proxy. The algorithm chooses a random element r$\in Z^*_p$, and transforms the signature of the delegatee into a signature of the delegator. Before transforming the signature, the proxy may verify whether it is indeed a valid signature from the corresponding delegatee. The verification proceeds in the following way:

$$I^{(1)} = e(\sigma_{j_{dee}}^{(1)}, \{T_j\}_{j=1}^k) = e(g,g)^{xs'} \cdot e(g,h)^{s'mxj} : \forall a_j \in \omega_{dee}$$

$$I^{(2)} = e(\sigma_{dee}^{(3)}, g) \cdot e((\sigma_{dee}^{(2)})^m, \{T_j'\}_{j=1}^k) = e(g,g)^{xs'} \cdot e(g,h)^{s'mxj} : \forall a_j \in \omega_{dee}$$

Now, if $I^{(1)} = I^{(2)}$ then the verification succeeds, and the proxy then proceeds to generate the second level (or final) signature. The generation of the second level signature comprises the following steps:

In the first step, it computes the following:

$$Z^{(1)} = e(\sigma_{j_{dee}}^{(1)}, g) = e\left( g^{\frac{x}{x_j}s'} \cdot h^{s'm}, g \right) = e(g,g)^{\frac{xs'}{x_j}} \cdot e(g,h)^{ms'} : \forall a_j \in \omega_{dee}$$

In the second step, it computes the following:

$$Z^{(2)} =$$

$$Z^{(1)} \cdot e(\sigma_{dee}^{(4)}, \sigma_{dee}^{(5)}) = e(g, g)^{\frac{xs'}{xj}} \cdot e(g, h)^{ms'} \cdot e\left(g^{\frac{-s't}{xj}}, g^{qs'}\right) : \forall a_j \in \omega_{dee} =$$

$$e(g, g)^{\frac{xs'}{xj}} \cdot e(g, h)^{ms'} \cdot e(g, g)^{\frac{-s'tq}{xj}} : \forall a_j \in \omega_{dee} =$$

$$e(g, g)^{\frac{xs'}{xj}} \cdot e(g, h)^{ms'} \cdot e(g, g)^{\frac{-s'x}{xj}} = e(h, g)^{ms'}, \forall a_j \in \omega_{dee}.$$

In the third step, it computes the following:

$$c = H((Z^{(2)}), g^r) = H(e(h,g)^{ms'}, g^r),$$

wherein "H" is a hash function.

In the fourth step, it computes the following:

$$\sigma_{j_p}^{(1)} = \left\{ g^{\frac{xdr}{xj}} \cdot h^{cr} \right\}_{a_j \in \omega}$$

$$\sigma_p^{(2)} = g^r, \sigma_p^{(3)} = \sigma_{dee}^{(2)} = g^{s'}$$

$$\sigma_p^{(4)} = (RSK^{(2)})^r = g^{xdr}.$$

In the final step, it outputs the signature:

$$\sigma_{proxy} = (\sigma_{j_p}^{(1)}, \sigma_p^{(2)}, \sigma_p^{(3)}, \sigma_p^{(4)}).$$

Verify($\sigma_{proxy}$,PK). To verify the converted signature, the verifier may perform the following steps:

In the first step, it computes the following:

$$c' = H(e(\sigma_p^{(3)}, h^m), \sigma_p^{(2)}) = H(e(g^{s'}, h^m), g^r).$$

In the second step, it accepts the signature if the following holds:

$$e(\sigma_{j_p}^{(1)}, \{T_j\}_{j=1}^k) = e(\sigma_p^{(4)}, g)e(\sigma_p^{(2)}, \{T'_j\}_{j=1}^k)$$

$$e\left(g^{\frac{xdr}{xj}} \cdot h^{cr}, g^{xj}\right) = e(g^{xdr}, g) \cdot e(g^{rc'}, h^{xj}) : \forall a_j \in w$$

$$e(g, g)^{\left(\frac{xdr}{xj}\right)xj} \cdot e(h, g)^{crxj} = e(g, g)^{xdr} \cdot e(g, h)^{c'rxj} : \forall a_j \in w$$

$$e(g, g)^{xdr} \cdot e(h, g)^{crxj} = e(g, g)^{xdr} \cdot e(g, h)^{c'rxj} : \forall a_j \in w$$

It will be understood that the algorithms described above in the first and second embodiments, can be applied in embodiments of the system described with reference to FIG. 1 and embodiments of the method described with reference to FIG. 2.

It will be appreciated that the invention also applies to computer programs, particularly computer programs on or in a carrier, adapted to put the invention into practice. The program may be in the form of a source code, an object code, a code intermediate a source and object code such as in a partially compiled form, or in any other form suitable for use in the implementation of the method according to the invention. It will also be appreciated that such a program may have many different architectural designs. For example, a program code implementing the functionality of the method or system according to the invention may be sub-divided into one or more sub-routines. Many different ways of distributing the functionality among these sub-routines will be apparent to the skilled person. The sub-routines may be stored together in one executable file to form a self-contained program. Such an executable file may comprise computer-executable instructions, for example, processor instructions and/or interpreter instructions (e.g. Java interpreter instructions). Alternatively, one or more or all of the sub-routines may be stored in at least one external library file and linked with a main program either statically or dynamically, e.g. at run-time. The main program contains at least one call to at least one of the sub-routines. The sub-routines may also comprise function calls to each other. An embodiment relating to a computer program product comprises computer-executable instructions corresponding to each processing step of at least one of the methods set forth herein. These instructions may be sub-divided into sub-routines and/or stored in one or more files that may be linked statically or dynamically. Another embodiment relating to a computer program product comprises computer-executable instructions corresponding to each means of at least one of the systems and/or products set forth herein. These instructions may be sub-divided into sub-routines and/or stored in one or more files that may be linked statically or dynamically.

The carrier of a computer program may be any entity or device capable of carrying the program. For example, the carrier may include a storage medium, such as a ROM, for example, a CD ROM or a semiconductor ROM, or a magnetic recording medium, for example, a hard disk. Furthermore, the carrier may be a transmissible carrier such as an electric or optical signal, which may be conveyed via electric or optical cable or by radio or other means. When the program is embodied in such a signal, the carrier may be constituted by such a cable or other device or means. Alternatively, the carrier may be an integrated circuit in which the program is embedded, the integrated circuit being adapted to perform, or used in the performance of, the relevant method.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. An attribute-based digital signature system, comprising:
a memory device storing instructions; and
a processor that generates:
   a first signature for a document, based on a first signature key and the document;
   a re-signing key based on a second signature key associated with a second set of attributes, wherein the re-signing key enables the processor to convert the first signature into a second signature associated with the second set of attributes, the second signature key enables the processor to generate a signature associated with the second set of attributes based on the document, and the first signature key and the re-signing key are generated as a key pair; and
   the second signature for the document, based on the first signature and the re-signing key, wherein the second signature is associated with the second set of attributes determined by the re-signing key, and the second set of attributes comprises a plurality of attributes, and the first signature key is generated based on the second signature key, wherein the processor is arranged to handle attributes associated with the first signature and/or the second signature.

2. The system according to claim 1, wherein the first signature is associated with a first set of attributes, wherein the first set of attributes comprises a plurality of attributes, and the processor generates the second signature only if the first set of attributes satisfies a set of conditions.

3. The system according to claim 2, wherein the processor generates the re-signing key in dependence on the set of conditions, wherein the re-signing key enables the processor to convert a first signature associated with any set of attributes satisfying the set of conditions into the second signature.

4. The system according to claim 2, wherein the processor is arranged for using a public key to verify whether the first signature is associated with a first set of attributes satisfying a set of conditions, and for generating the second signature only in the case that the first signature is associated with a set of attributes satisfying the set of conditions.

5. The system according to claim 1, further comprising a delegation unit for enabling a user who possesses the second set of attributes to delegate his authority to sign a document with a signature associated with the second set of attributes to another user by providing the processor with the re-signing key.

6. A workstation comprising the system according to claim 1.

7. The system according to claim 1, wherein the re-signing converts the first signature into the second signature.

8. The system according to claim 1, wherein the resigning key cryptographically incorporates the set of conditions over the attributes.

9. The system according to claim 1, wherein the processor employs the following algorithm: Re-Sign (RSK$_{proxy}$, σ$_{delegatee}$), wherein RSK$_{proxy}$ is the first signature and σ$_{delegate}$ is the re-signing key.

10. The system according to claim 1, wherein the attributes include at least a role.

11. A method of attribute-based digital signature generation, comprising:

generating, with a processor, a first signature for a document, based on the first signature key and the document generating, with the processor, a re-signing key based on the second signature key associated with a second set of attributes, wherein the re-signing key enables the processor to convert the first signature into a second signature associated with the second set of attributes, the second signature key enables the processor to generate a signature associated with the second set of attributes based on the document, and the first signature key and the re-signing key are generated as a key pair;

generating, with the processor, a second signature for the document, based on the first signature and the re-signing key, wherein the second signature is associated with the second set of attributes determined ate re-signing key, and the second set of attributes comprises a plurality of attributes, and the first signature key is generated base on the second signature key, and the processor is arranged to handle attributes associated with the first signature and/or second signature.

12. The system according to claim 9, further comprising: a trusted proxy that executes the algorithm.

13. The system according to claim 12, wherein the trusted proxy verifies the first signature was produced by a delegatee prior to producing the second signature.

14. The system according to claim 13, wherein the trusted proxy proceeds to convert the first signature to the second signature only in response to the trusted proxy verifying that the first signature was produced by the delegate.

15. The system according to claim 12, wherein the algorithm chooses a random element and transforms the first signature into the second signature.

16. The system according to claim 15, wherein the trusted proxy verifies the first signature is a valid signature.

17. A non-transitory computer readable medium encoded with computer executable instructions, which, when executed by a processor of a computer, causes the processor to:

generate a first signature for a document, based on the first signature key and the document generate a re-signing key based on the second signature key associated with a second set of attributes, wherein the re-signing key enables the processor to convert the first signature into a second signature associated with the second set of attributes, the second signature key enables the processor to generate a signature associated with the second set of attributes based on the document, and the first signature key and the re-signing key are generated as a key pair;

generate a second signature for the document, based on the first signature and the re-signing key, wherein the second signature is associated with the second set of attributes determined by the re-signing key, and the second set of attributes comprises a plurality of attributes, and the first signature key is generated based on the second signature key, and the processor is arranged to handle attributes associated with the first signature and/or second signature.

* * * * *